United States Patent
Kang

(10) Patent No.: US 11,811,815 B2
(45) Date of Patent: Nov. 7, 2023

(54) IP-BASED SECURITY CONTROL METHOD AND SYSTEM THEREOF

(71) Applicant: AI SPERA INC., Seoul (KR)

(72) Inventor: Byung Tak Kang, Seoul (KR)

(73) Assignee: AI SPERA INC., Seoul (KR)

( * ) Notice: Subject to any disclaimer, the term of this patent is extended or adjusted under 35 U.S.C. 154(b) by 224 days.

(21) Appl. No.: 17/409,328

(22) Filed: Aug. 23, 2021

(65) Prior Publication Data
US 2022/0159030 A1 May 19, 2022

(30) Foreign Application Priority Data

Nov. 19, 2020 (KR) .................. 10-2020-0155163

(51) Int. Cl.
*H04L 9/40* (2022.01)
*H04L 43/06* (2022.01)

(52) U.S. Cl.
CPC ...... *H04L 63/1433* (2013.01); *H04L 63/0236* (2013.01); *H04L 63/1416* (2013.01); *H04L 63/20* (2013.01); *H04L 43/06* (2013.01)

(58) Field of Classification Search
CPC ............ H04L 63/1433; H04L 63/0236; H04L 63/1416; H04L 63/20; H04L 43/06
See application file for complete search history.

(56) References Cited

U.S. PATENT DOCUMENTS

| 2006/0031938 A1* | 2/2006 | Choi | H04L 63/1441 |
| | | | 726/25 |
| 2006/0053490 A1* | 3/2006 | Herz | H04L 63/1425 |
| | | | 726/23 |
| 2014/0075564 A1* | 3/2014 | Singla | H04L 41/0894 |
| | | | 726/25 |
| 2014/0237599 A1* | 8/2014 | Gertner | H04L 63/1425 |
| | | | 726/24 |

(Continued)

FOREIGN PATENT DOCUMENTS

| KR | 10-2006-0031594 A | 4/2006 |
| KR | 10-2010-0120966 A | 11/2010 |
| KR | 10-2019-0028076 A | 3/2019 |

OTHER PUBLICATIONS

An Office Action mailed by the Korean Intellectual Property Office dated Oct. 29, 2021, which corresponds to Korean Patent Application No. 10-2020-0155163 and is related to U.S. Appl. No. 17/409,328.

*Primary Examiner* — Cheng-Feng Huang
(74) *Attorney, Agent, or Firm* — Studebaker & Brackett PC

(57) ABSTRACT

The present disclosure relates to an IP-based security control method and a system thereof. According to the present disclosure, the method comprises: selecting a target IP address that is an IP address of a security control target; generating IP monitoring information by scanning a port of the target IP address; determining an IP risk level of the target IP address by using the IP monitoring information; and generating a security report including at least one of an (Continued)

IP list determined by a preset IP risk level and IP monitoring information of an IP included in the IP list, wherein the IP monitoring information includes at least one of an IP address of the target IP address, banner information, application information, security vulnerability information, a malicious code, and a similar domain.

8 Claims, 9 Drawing Sheets

(56) References Cited

U.S. PATENT DOCUMENTS

| | | | | |
|---|---|---|---|---|
| 2015/0326588 | A1* | 11/2015 | Vissamsetty | H04L 63/1491 |
| | | | | 726/23 |
| 2017/0006054 | A1* | 1/2017 | Stiansen | G06F 21/552 |
| 2019/0387022 | A1* | 12/2019 | Bagarolo | H04L 63/1483 |

* cited by examiner

IP-BASED SECURITY CONTROL METHOD AND SYSTEM THEREOF

CROSS-REFERENCE TO RELATED APPLICATION

A claim for priority under 35 U.S.C. § 119 is made to Korean Patent Application No. 10-2020-0155163 filed on Nov. 19, 2020 in the Korean Intellectual Property Office, the entire contents of which are hereby incorporated by reference.

BACKGROUND

1. Technical Field

The present disclosure relates to an Internet Protocol (IP)-based security control method and a system thereof.

2. Description of Related Art

Recently, cyber security threats have been increasing, along with an increase in Internet services, and thus the need for security control in response is increasing. In particular, security control is essential for Internet service companies.

However, as the response time for cyber security threats increases with the continuous security threats and the increasingly intelligent forms of cyber threat, it is insufficient to deal with these threats with existing manpower, and inefficient situations are occurring. The need for security control is growing in both domestic and foreign cyber security markets, but it is not easy to proceed due to the cost burden.

Also, there are frequent cases of (bad actors) using a phishing site by creating a domain similar to a company's internet service domain, and the case of using the company's internet service IP address as a malicious code spreading site is increasing. Accordingly, it is necessary to determine whether a company's IP address has been abused by malicious code/phishing.

In particular, in recent cyber attacks, the spread of malicious codes through websites with many user accesses is used as the main spreading route. After a hacker hacks a website with a lot of user access, a malicious script with an attack code for vulnerabilities may be hidden therein. When a user in a personal computing environment with vulnerability accesses a forged website, a malicious code is downloaded and installed on the personal computer, which is then infected with the malicious code without the user's awareness.

The number of new malicious codes created by hackers for financial gain increases exponentially every year. Thus, with only the antivirus method, which is the existing endpoint security technology that only protects against presently known malicious codes, there is a limit to protecting a company or institution from the risk of being infected with new and variant malicious codes through forged websites.

In addition, the network security method, which analyzes packets flowing into the network to identify malicious codes, has a very high detection rate of false positives due to numerous normal file packets, which imposes a heavy workload on security system operators. Hence, it is very ineffective to use as a response technology for intelligent persistent threats through websites.

For this reason, even though a solution known as a vulnerability scanner is used, it simply finds a number of vulnerabilities and notifies an administrator thereof. The administrator cannot obtain any information on which vulnerability to solve first. Furthermore, manual analysis that takes several weeks or several months needs to be performed to obtain such information.

However, even after spending a lot of time and money to perform analysis, it is practically impossible to solve all discovered security vulnerabilities. Hence, the security level is gradually decreasing despite management of the vulnerability.

Therefore, there is a need for specific and clear analysis reports and solutions that can reduce security damage caused by vulnerability in corporate IT assets.

The above information described in this background section is only to enhance the understanding of the background of the present disclosure and therefore it may contain information that does not form the related art that is already known to a person having ordinary skill in the field to which this technology pertains.

SUMMARY

An aspect of the present disclosure is directed to providing a security control solution that accurately and efficiently identifies security risk factors based on IP, and quickly provides the identified security risk factors to an administrator, so that the administrator can preemptively respond to the detected risk IP and malicious code on a web site.

The aspects of the present disclosure are not limited to those mentioned above, and other aspects not mentioned herein will be clearly understood by those skilled in the art from the following description.

A security control method performed by a control unit included in a security control server includes: selecting a target IP address that is an IP address of a security control target; generating IP monitoring information by scanning a port of the target IP address; determining an IP risk level of the target IP address by using the IP monitoring information; and generating a security report including at least one of an IP list determined by a preset IP risk level and IP monitoring information of an IP included in the IP list, wherein the IP monitoring information includes at least one of an IP address of the target IP address, banner information, application information, security vulnerability information, a malicious code, and a similar domain.

The method according to an embodiment further includes: selecting a target keyword; and scanning a port of the first IP, and generating the IP monitoring information of a first IP when the target keyword is present in the banner information of the first IP or the malicious code.

The method according to an embodiment further includes: selecting a target domain; extracting a domain similar to the target domain; identifying whether the similar domain is preempted; and when the similar domain is preempted, storing the similar domain as the IP monitoring information of a second IP that is an IP address of the target domain.

In one embodiment, in the selection of the target IP address, an IP address of the similar domain is selected as the target IP address.

The method according to an embodiment further includes: storing the IP monitoring information in a database; and classifying and storing the IP monitoring information according to a presence or absence of the banner information, a presence or absence of the malicious code information, and a presence or absence of the similar domain.

A security control server according to one embodiment includes: a communication unit configured to communicate data with an external server; a database unit configured to store data; and a control unit configured to select a target IP address that is an IP address of a security control target, generate IP monitoring information by scanning a port of the target IP address, determine an IP risk level of the target IP address by using the IP monitoring information, and generate a security report including at least one of an IP list determined as a preset IP risk level and IP monitoring information of an IP included in the IP list, wherein the IP monitoring information includes at least one of an IP address of the target IP address, banner information, application information, security vulnerability information, a malicious code, and a similar domain.

According to the embodiments as described above, it is possible to provide a security control system that accurately and efficiently identifies security risk factors based on IP and promptly delivers the identified security risk factors to an administrator.

According to an embodiment, the administrator can preemptively respond to the detected risk IP and malicious code on a website.

The security control system of one embodiment operates unattended, and by rapidly recognizing, analyzing and processing security threats with high priority, it is possible to shorten the response time for security risks to increase security efficiency. In addition, it is possible to reduce the burden of expenses such as related personnel labor cost and infrastructure construction cost.

The advantages of the present disclosure are not limited to the above-mentioned advantages, and other advantages, which are not specifically mentioned herein, will be clearly understood by those skilled in the art from the following description.

DETAILED DESCRIPTION

The advantages and features of the present disclosure and methods of achieving them will be apparent from the embodiments that will be described in detail with reference to the accompanying drawings. It should be noted, however, that the present disclosure is not limited to the following embodiments, and may be implemented in various different forms. Rather the embodiments are provided so that this disclosure will be thorough and complete and will fully convey the scope of the present disclosure to those skilled in the technical field to which the present disclosure pertains, and the present disclosure will only be defined by the appended claims.

Terms used in the specification are used to describe embodiments of the present disclosure and are not intended to limit the scope of the present disclosure. In the specification, the terms of a singular form may include plural forms unless otherwise specified. The expressions "comprise" and/or "comprising" used herein indicate existence of one or more other elements other than stated elements but do not exclude presence of additional elements. Like reference denotations refer to like elements throughout the specification. As used herein, the term "and/or" includes each and all combinations of one or more of the mentioned elements. It will be understood that, although the terms "first", "second", etc., may be used herein to describe various elements, these elements should not be limited by these terms. These terms are only used to distinguish one element from another element. Accordingly, a first element mentioned below could be termed a second element without departing from the technical ideas of the present disclosure.

Unless otherwise defined, all terms (including technical and scientific terms) used herein have the same meaning as commonly understood by those skilled in the technical field to which the present disclosure pertains. It will be further understood that terms, such as those defined in commonly used dictionaries, should not be interpreted in an idealized or overly formal sense unless expressly so defined herein.

Hereinafter, an embodiment will be described in detail with reference to the accompanying drawings.

Figure 1:
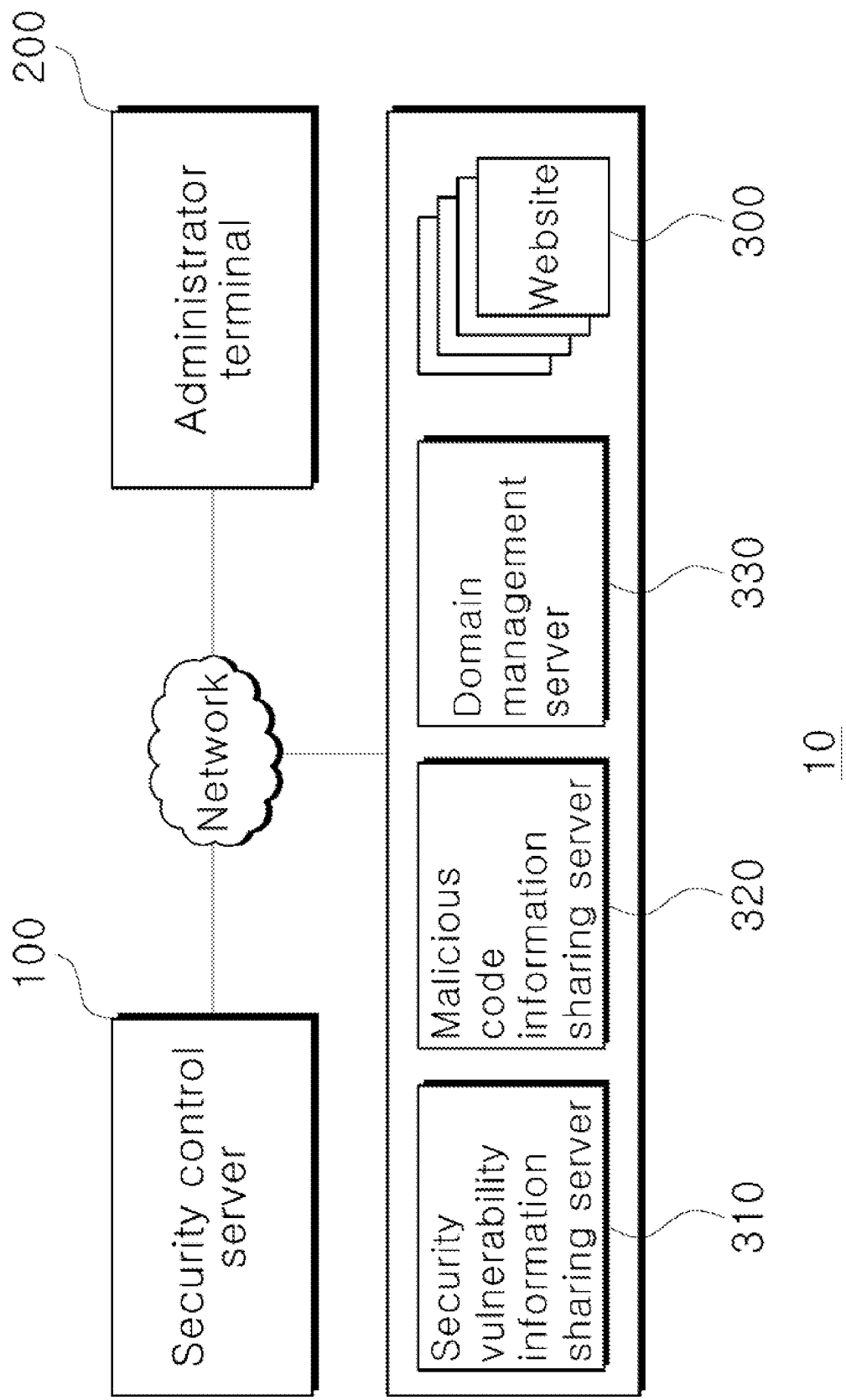
FIG. 1 is a diagram illustrating an IP-based security control system according to an embodiment of the present disclosure.

FIG. 1 is a diagram illustrating an IP-based security control system 10 according to an embodiment of the present disclosure.

Referring to FIG. 1, the IP-based security control system 10 according to an embodiment of the present disclosure includes a security control server 100, an administrator terminal 200, a website server 300, a security vulnerability information sharing server 310, a malicious code information sharing server 320, and a domain management server 330.

First, the website server 300 is an external server that provides a website, and the IP of the website server 300 is subject to security control.

The security vulnerability information sharing server 310 is an external server that shares known security vulnerability data, and may correspond to, for example, a National Vulnerability Database (NVD) providing server.

The malicious code information sharing server 320 is an external server that shares known malicious code data, and provides an application program interface (API) to determine whether the input web site is a malicious code hiding website.

The domain management server 330 is an external server that manages domain resources and information, and may correspond to, for example, a server that stores nslookup and who is information.

Communication between various entities included in the IP-based security control system 10 may be performed through a wired/wireless network. Wired/wireless networks may use standard communication technologies and/or protocols.

The security control server 100 and the administrator terminal 200 in the IP-based security control system 10 are, for example, one of electronic devices such as a computer, an Ultra Mobile PC (UMPC), a workstation, a net-book, a Personal Digital Assistant (PDA), a portable computer, a web tablet, a wireless phone, a mobile phone, a smartphone, and a portable multimedia player (PMP), and may include any electronic device capable of installing and executing an application related to an embodiment. The electronic device may perform overall service operations such as, for example, configuration of a service screen, data input, data transmission/reception, and data storage under the control of the application.

The security control server 100 selects a target IP address that is an IP address which is a target of security control.

As an example, the security control server 100 may select, as a target IP address, an IP address input by an administrator, an IP address of a similar domain, an IP address of a risk IP provided by the security vulnerability information sharing server 310 or the malicious code information sharing server 320, an IP address of the server located in a region, and an IP address of the server operating the website in the field of a service. According to the administrator's choice or certain conditions (time, date, etc.), the target IP address may be selected from a variety thereof.

The security control server 100 scans the selected target IP address.

The security control server 100 scans all ports of the target IP address, collects banner information of all ports, and collects security vulnerability information and malicious codes of the target IP address. The security control server 100 may extract application information from the collected banner information.

The security control server 100 generates IP monitoring information.

IP monitoring information of an embodiment is security-related information that may be obtained by scanning a target IP address. For example, IP monitoring information may include an IP address, port banner information (including port information), application information, security vulnerability information, a malicious code, and a similar domain.

In addition, the security control server 100 may perform IP scanning and IP monitoring information generation by using a target keyword.

The security control server 100 selects a character string input by an administrator as a target keyword.

The security control server 100 scans a verifiable IP, and generates IP monitoring information of the corresponding IP. Specifically, when the target keyword is included in the banner information of the ports of the corresponding IP, the security control server 100 stores the corresponding banner information and application information as IP monitoring information. When the target keyword is included in the malicious code collected from the corresponding IP, the corresponding malicious code may be stored as IP monitoring information.

In addition, the security control server 100 may perform IP scanning and IP monitoring information generation by using a target domain.

The security control server 100 selects a domain input by an administrator as a target domain.

The security control server 100 extracts a similar domain from the entire domain list through a similar domain search algorithm. Various word similarity determination algorithms such as cosine similarity and N-gram may be used as a similarity domain search algorithm according to an embodiment.

The security control server 100 uses the domain management server 330 to identify whether the extracted similar domain is actually a domain preempted by another user.

The security control server 100 stores the similar domain whose preemption is identified as IP monitoring information for the IP of the target domain.

The security control server 100 selects an IP address of a similar domain whose preemption is identified as a target IP address, and performs IP scanning and IP monitoring information generation for the target IP address.

The security control server 100 determines the IP risk level by using the IP monitoring information.

The IP risk level of an embodiment is information indicating the degree of vulnerability of the corresponding IP to cyber threats. For example, the IP risk level may be composed of a "Safe" stage, a "Low" stage, a "Moderate" stage, a "Dangerous" stage, and a "Critical" stage.

The security control server 100 may determine the IP risk level by using various algorithms.

For example, the security control server 100 may determine the IP risk level by using a scoring algorithm. In other words, the security control server 100 may assign a score to the IP monitoring information and determine the IP risk level according to the sum of the assigned scores.

As another example, the security control server 100 may determine the IP risk level through machine learning. In other words, the security control server 100 may input IP monitoring information into the pre-learned machine learning model, and determine the IP risk level derived as a result thereof as the IP risk level of the corresponding IP.

The security control server 100 generates a security report according to the determined IP risk level, and outputs the generated security report to the display device or transmits the same to the administrator terminal 200 to provide the same to an administrator.

The security control server 100 may generate a security report including a list of IPs having an IP risk level of "Dangerous" and "Critical" stages and IP monitoring information of IPs included in the corresponding list.

The administrator terminal 200 receives the target IP address, target keyword, and target domain from an administrator, and transmits the input target IP address, target keyword, and target domain to the security control server 100.

The administrator terminal 200 receives the security report from the security control server 100 and outputs the received security report to the administrator.

Figure 2:
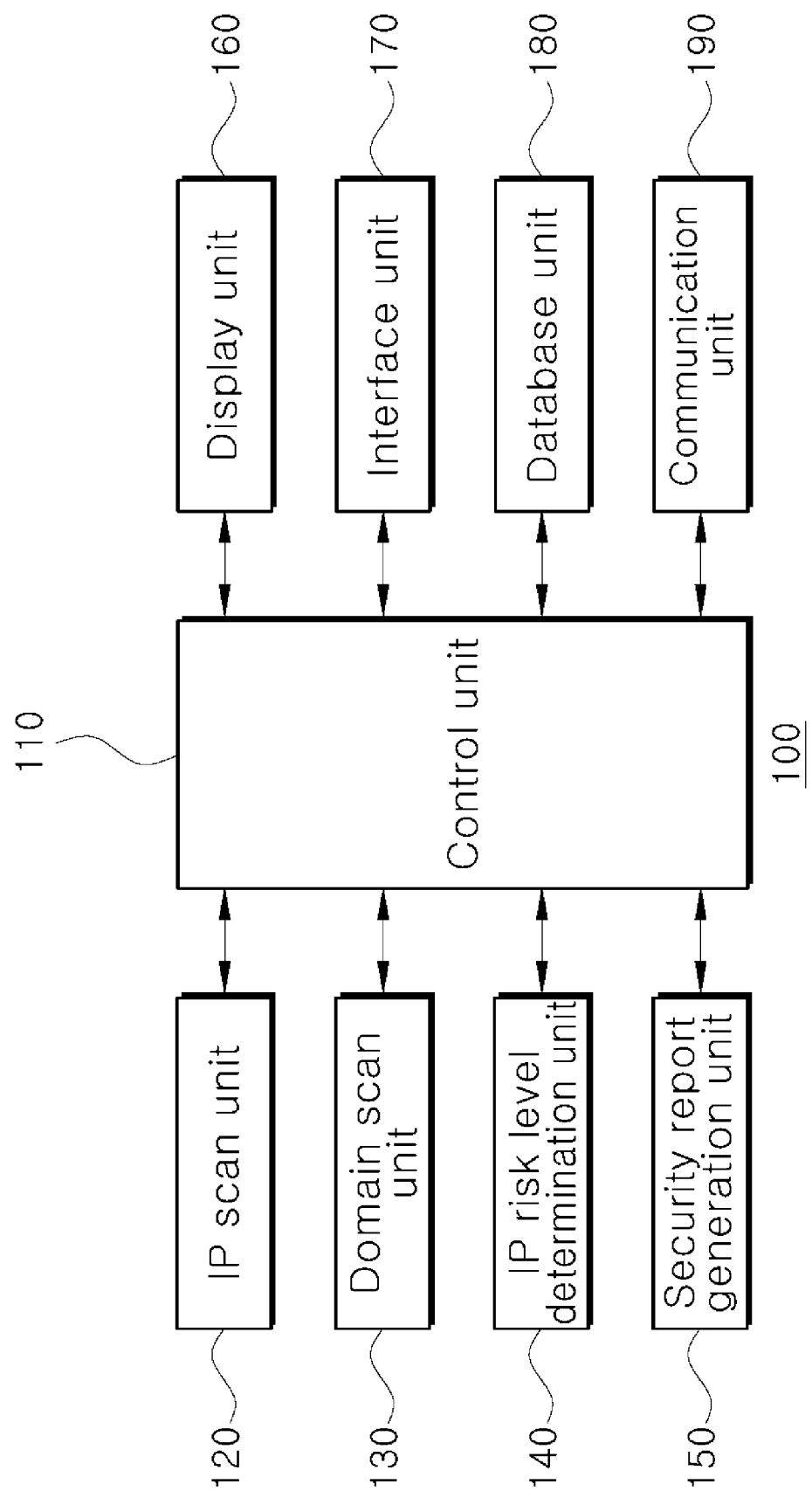
FIG. 2 is a diagram illustrating a configuration of a security control server according to an embodiment of the present disclosure.

FIG. 2 is a diagram illustrating a configuration of the security control server 100 according to an embodiment of the present disclosure.

Referring to FIG. 2, in an embodiment of the present disclosure, the security control server 100 includes a control unit 110, an IP scanning unit 120, a domain scanning unit 130, an IP risk level determination unit 140, and a security report generation unit 150, a display unit 160, an interface unit 170, a database unit 180, and a communication unit 190.

The hardware configuration of the security control server 100 may be implemented in various manners. Hardware may be configured by integrating the control unit 110 and the IP scanning unit 120 or by integrating the control unit 110 and the IP risk level determination unit 140. As such, the hardware configuration of the security control server 100 is not limited to the description of the present specification, and may be implemented in various methods and combinations.

The control unit 110 controls the IP scanning unit 120, the domain scanning unit 130, the IP risk level determination unit 140, the security report generation unit 150, the display unit, the interface unit 170, the database unit 180, and the communication unit 190 to perform various functions of the security control server 100.

In addition, the control unit 110 may also be known as a processor, a controller, a microcontroller, a microprocessor, and a microcomputer, and the control unit 110 may be implemented by hardware or firmware, software, or a combination thereof.

In addition, all functions of the corresponding configurations to be described below may be implemented under the control of the control unit 110, or may be directly implemented by the control unit 110.

The IP scanning unit 120 scans ports of the target IP address to generate IP monitoring information.

The IP scanning unit 120 selects a target IP address that is an IP address which is a target of security control. As an example, the IP scanning unit 120 may select, as a target IP address, an IP address input by an administrator, an IP address of a similar domain, an IP address of a risk IP provided by the security vulnerability information sharing server 310 or the malicious code information sharing server 320, an IP address of the server located in a region, and an IP address of the server operating the website in the field of a service. According to the administrator's choice or certain conditions (time, date, etc.), the target IP address may be selected from a variety thereof.

The IP scanning unit 120 scans the selected target IP address.

The IP scanning unit 120 scans the target IP address ranging from a 1.0.0.0/8 band to a 255.0.0.0/8 band, and collects banner information for all ports.

The IP scanning unit 120 extracts application information from the collected banner information. The application information according to an embodiment may include at least one of an application name, an application version, protocol information, and a scanned time.

The IP scanning unit 120 collects security vulnerability information of the target IP address.

The IP scanning unit 120 identifies whether security vulnerability is present in the target IP address using the security vulnerability data received from the security vulnerability information sharing server 310 or using the API provided by the security vulnerability information sharing server 310. The IP scanning unit 120 may use a security vulnerability detection method such as Common Vulnerability and Exposures (CVE), Common Weakness Enumeration (CWE), and Open Web Application Security Project (OWASP), and identify whether there is vulnerability that may occur in software and applications of the target IP address. The IP scanning unit 120 collects the identified security vulnerability information.

The IP scanning unit 120 collects malicious code information of the target IP address.

The IP scanning unit 120 uses malicious code data received from the malicious code information sharing server 320 or an API provided by the malicious code information sharing server 320 to identify whether there is any malicious code in the web code of the target IP address, and collects the information of the identified malicious code. The malicious code information according to an embodiment may include at least one of an MD5 hash value, a URL of a malicious code providing site, a malicious domain, and a collection time.

The IP scanning unit 120 generates IP monitoring information. IP monitoring information of an embodiment is security-related information that may be obtained by scanning a target IP address. For example, IP monitoring information may include at least one of an IP address, port banner information (including port information), application information, security vulnerability information, a malicious code, and a similar domain.

In addition, the IP scanning unit 120 may perform an IP scan and generate IP monitoring information by using a target keyword. The IP scanning unit 120 selects a character string input by an administrator as a target keyword.

The IP scanning unit 120 scans a verifiable IP, and stores IP monitoring information of the corresponding IP. Specifically, when the target keyword is included in the banner information of the ports of the corresponding IP, the IP scanning unit 120 stores the corresponding banner information and application information. When the target keyword is included in the malicious code collected from the corresponding IP, the corresponding malicious code may be stored.

In addition, the IP scanning unit 120 may perform IP scanning and IP monitoring information generation by using a target domain. The IP scanning unit 120 selects an IP address of a similar domain extracted by the domain scanning unit 130 as a target IP address, and performs IP scanning and IP monitoring information generation for the target IP address.

The domain scanning unit 130 selects a domain input by an administrator as a target domain.

The domain scanning unit 130 extracts a similar domain from the entire domain list through a similar domain search algorithm. Various word similarity determination algorithms such as cosine similarity and N-gram may be used as a similarity domain search algorithm according to an embodiment.

The domain scanning unit 130 uses the domain management server 330 to identify whether the extracted similar domain is actually a domain preempted by another user.

The domain scanning unit 130 stores the similar domain whose preemption is identified as IP monitoring information for the IP of the target domain.

The domain scanning unit 130 transmits an IP address of a similar domain whose preemption is identified to the IP scanning unit 120, and the IP scanning unit 120 performs IP scanning and IP monitoring information generation for the IP address of the similar domain.

The IP risk level determination unit 140 determines the IP risk level by using the IP monitoring information. As described above. The IP risk level of an embodiment is information indicating the degree of vulnerability of the corresponding IP to cyber threats. For example, the IP risk level may be composed of a "Safe" stage, a "Low" stage, a "Moderate" stage, a "Dangerous" stage, and a "Critical" stage.

The IP risk level determination unit 140 may determine the IP risk level by using various algorithms.

In a first embodiment, the IP risk level determination unit 140 may determine the IP risk level by using a scoring algorithm. In other words, the security control server 100 may assign a score to the IP monitoring information and determine the IP risk level according to the sum of the assigned scores.

In a second embodiment, the IP risk level determination unit 140 may determine the IP risk level through machine learning. In other words, the security control server 100 may input IP monitoring information into the pre-learned machine learning model, and determine the IP risk level derived as a result thereof as the IP risk level of the corresponding IP.

The security report generation unit 150 generates a security report according to the IP risk level.

The security report generation unit 150 may generate a security report including a list of IPs having an IP risk level of "Dangerous" and "Critical" stages and IP monitoring information of the corresponding IP.

The security report generation unit 150 may generate a security report for each preset unit time.

The security report generation unit 150 outputs the generated security report through the display unit 160 or transmits the same to the administrator terminal 200 to provide the same to an administrator.

The display unit 160 may provide various screen images. In particular, the display unit 160 may display the security report generated by the security report generation unit 150.

The interface unit 170 may receive various user inputs and transmit them to the control unit 110. In particular, the interface unit 170 may include a touch sensor, a (digital) pen sensor, a pressure sensor, a key, or a microphone. The touch sensor may use, for example, at least one of capacitive, resistive, infrared, and ultrasonic methods. The (digital) pen sensor may be, for example, a part of a touch panel or may include a separate recognition sheet. The key may include, for example, a physical button, an optical key, or a keypad. The microphone is a component for receiving a user's voice and may be provided inside the security control server 100. However, this is merely an example, and the microphone may be provided outside the security control server 100 and electrically connected to the security control server 100.

The database unit 180 may store commands or data related to at least one other constituent of the security control server 100. In particular, the database unit 180 may be implemented as a non-volatile memory, a volatile memory, a flash-memory, a hard disk drive (HDD), or a solid state drive (SSD). The database unit 180 may be accessed by the control unit 110, and read/record/correct/delete/update of data may be performed by the control unit 110. In the present disclosure, the term "memory" may include a database unit 180, a ROM (not shown) in the control unit 180, a RAM (not shown), or a memory card (not shown) mounted in the security control server 100 (for example, a micro SD card, and a memory stick). In addition, the database unit 180 may store programs and data for configuring various screen images to be displayed on the display area of the display unit 160.

The database unit 180 may store IP monitoring information. The database 180 may classify and store the IP monitoring information according to a presence or absence of banner information (port information), a presence or absence of malicious code information, and a presence or absence of similar domains.

The communication unit 190 may communicate with an external device through various communication methods. In particular, the communication unit 190 may communicate with the administrator terminal 200 to receive a target IP address, a target keyword, and a target domain, and transmit a security report.

Figure 3:
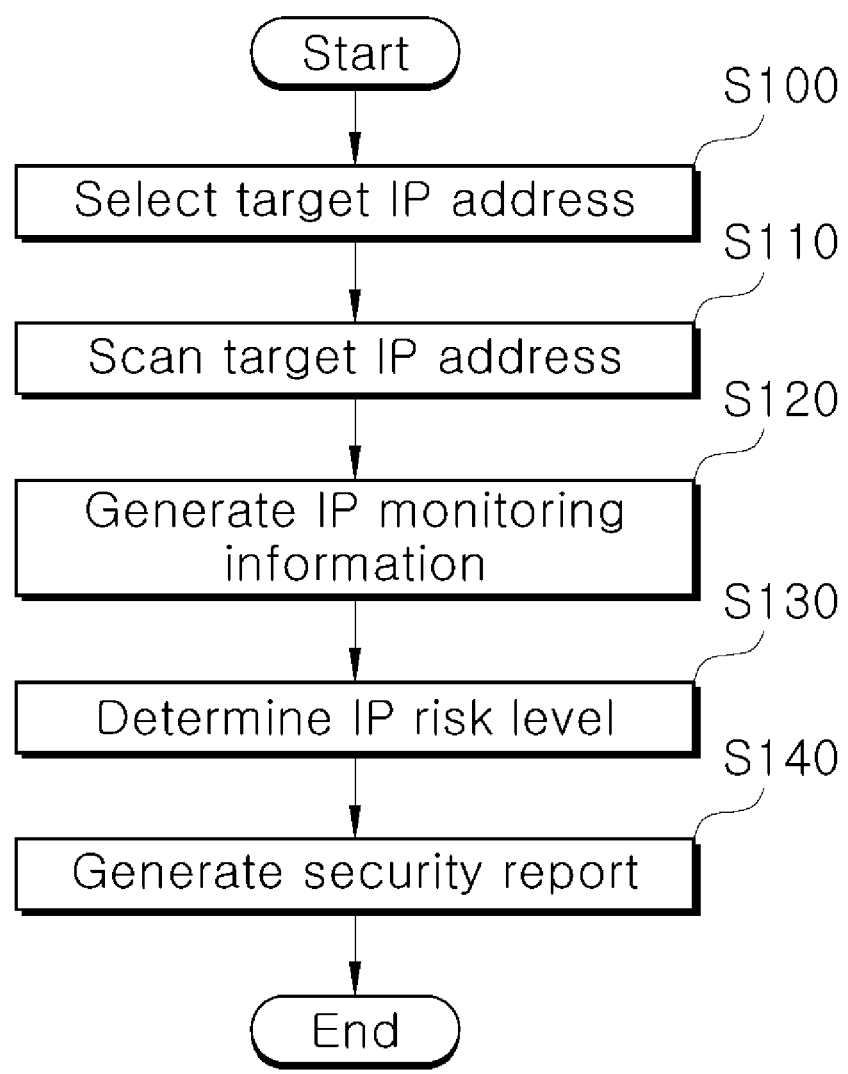
FIG. 3 is a flowchart of a security control method according to an embodiment of the present disclosure.

FIG. 3 is a flowchart of a security control method according to an embodiment of the present disclosure.

Referring to FIG. 3, the security control method according to an embodiment includes: selecting a target IP address S100; scanning a target IP address S110; generating an IP monitoring information S120; determining an IP risk level S130; and generating a security report S140.

In the selection of the target IP address S100, the security control server 100 selects target IP address that is an IP address which is a target of security control. The method of selecting the target IP address of the security control server 100 has been described above.

In addition, in the scanning of the target IP address S110, the security control server 100 scans the selected target IP address. The security control server 100 scans all ports of the target IP address, collects banner information of all ports, and collects security vulnerability information and malicious codes of the target IP address. The security control server 100 may extract application information from the collected banner information.

In addition, in the generation of the IP monitoring information S120, the security control server 100 generates IP monitoring information.

IP monitoring information of an embodiment is security-related information that may be obtained by scanning a target IP address. For example, IP monitoring information may include at least one of an IP address, port banner information (including port information), application information, security vulnerability information, a malicious code, and a similar domain.

In addition, in the determination of the IP risk level S130, the security control server 100 determines the IP risk level by using the IP monitoring information. The IP risk level of an embodiment is information indicating the degree of vulnerability of the corresponding IP to cyber threats. For example, the IP risk level may be composed of a "Safe" stage, a "Low" stage, a "Moderate" stage, a "Dangerous" stage, and a "Critical" stage.

In addition, in the generation of the security report S140, the security control server 100 generates a security report according to the determined IP risk level, and outputs the generated security report to the display device or transmits the same to the administrator terminal 200 to provide the same to an administrator. The security control server 100 may generate a security report including a list of IPs having an IP risk level of "Dangerous" and "Critical" stages and IP monitoring information of the corresponding IP.

Figure 4:
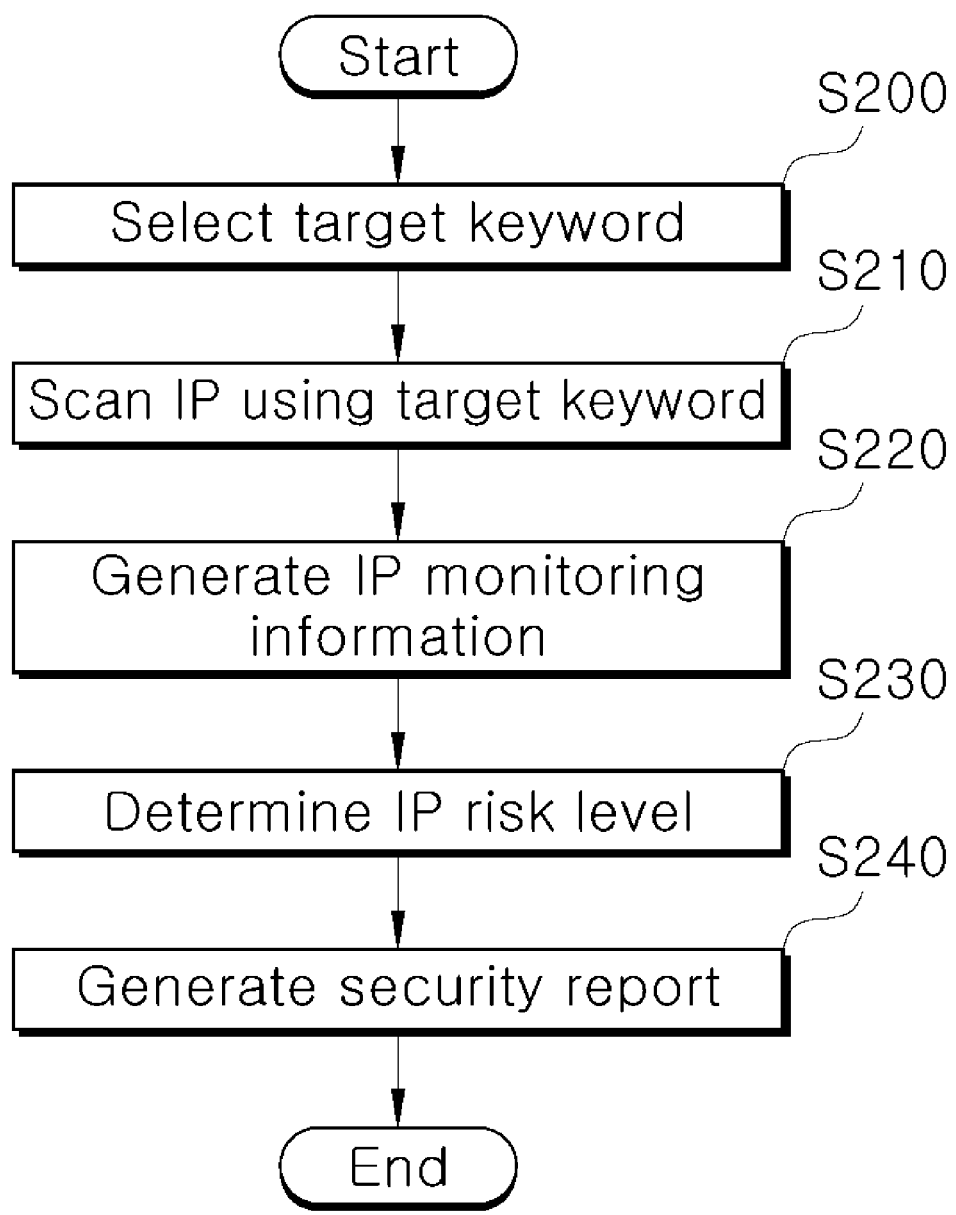
FIG. 4 is a flowchart of a security control method according to another embodiment of the present disclosure.

FIG. 4 is a flowchart of a security control method according to another embodiment of the present disclosure.

Referring to FIG. 4, a security control method according to another embodiment is a security control method using a target keyword, and includes: selecting a target keyword S200, scanning an IP using the target keyword S210, generating IP monitoring information S220; determining an IP risk level S230; and generating a security report S240.

In the selection of the target keyword S200, the security control server 100 selects a character string input by an administrator as a target keyword.

In addition, in the scanning of the IP using the target keyword S210, the security control server 100 scans a verifiable IP.

In addition, in the generation of the IP monitoring information S220, the security control server 100 scans a verifiable IP and generates IP monitoring information of the corresponding IP.

In addition, the determination of the IP risk level S230 and the generation of the security report S240 are the same as the security control method of FIG. 3.

Figure 5:
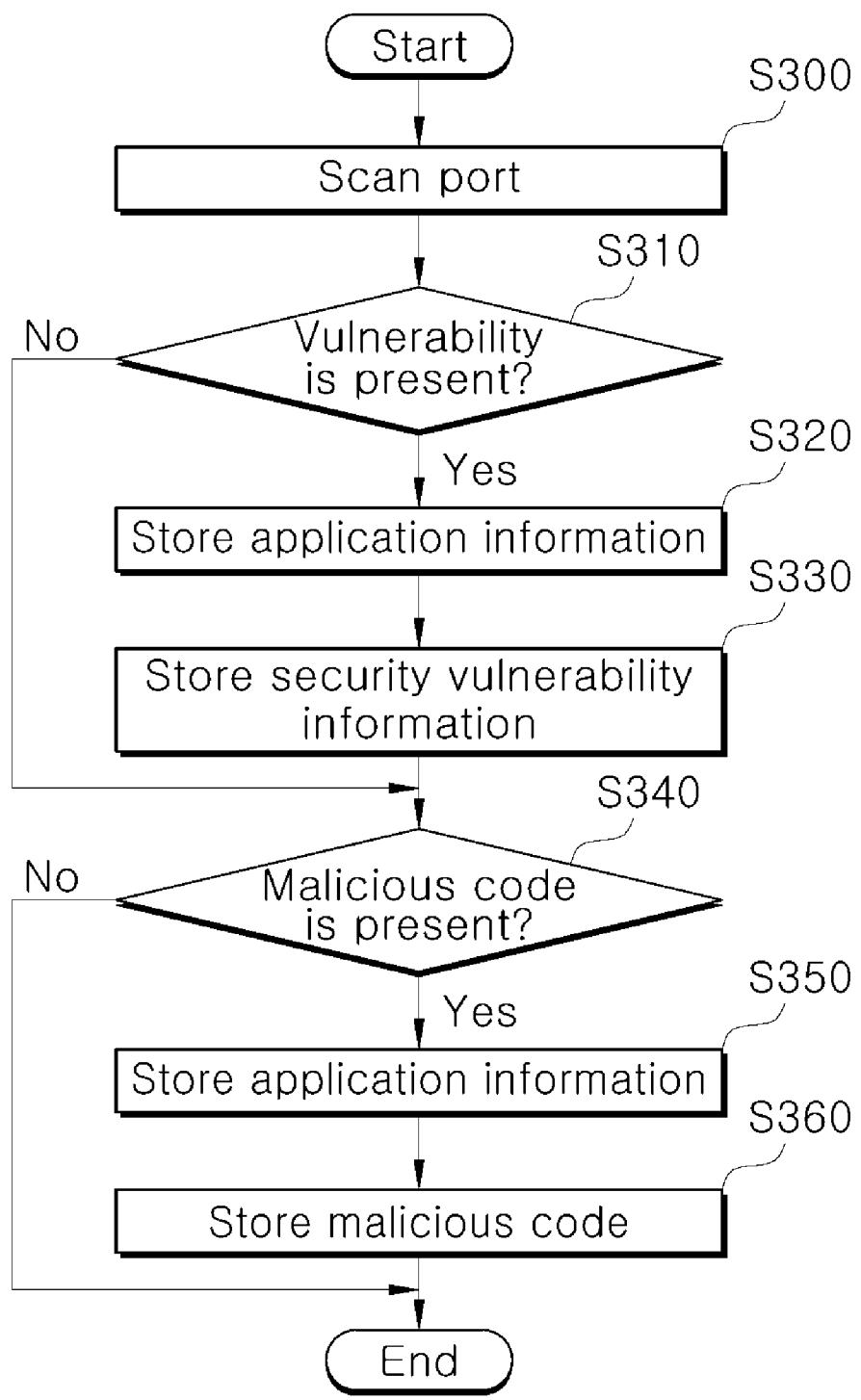
FIG. 5 is a flowchart of a method for extracting IP monitoring information according to an embodiment of the present disclosure.

FIG. 5 is a flowchart of a method for extracting IP monitoring information according to an embodiment of the present disclosure.

Referring to FIG. 5, the method for extracting IP monitoring information according to an embodiment includes: scanning a port S300; determining a presence or absence of vulnerability S310; storing application information S320; storing vulnerability information S330; determining a presence or absence of a malicious code S340; storing application information S350; and storing malicious code information S360.

The security control server 100 scans all ports of the target IP address S300.

In addition, the security control server 100 identifies whether a vulnerability is present S310. When the vulnerability is present, the application information and the security vulnerability information are stored as IP monitoring information S320, S330.

In addition, the security control server 100 identifies whether a malicious code is present S340. When the malicious code is present, the application information and the malicious code information are stored as IP monitoring information S350, S360.

Figure 6:
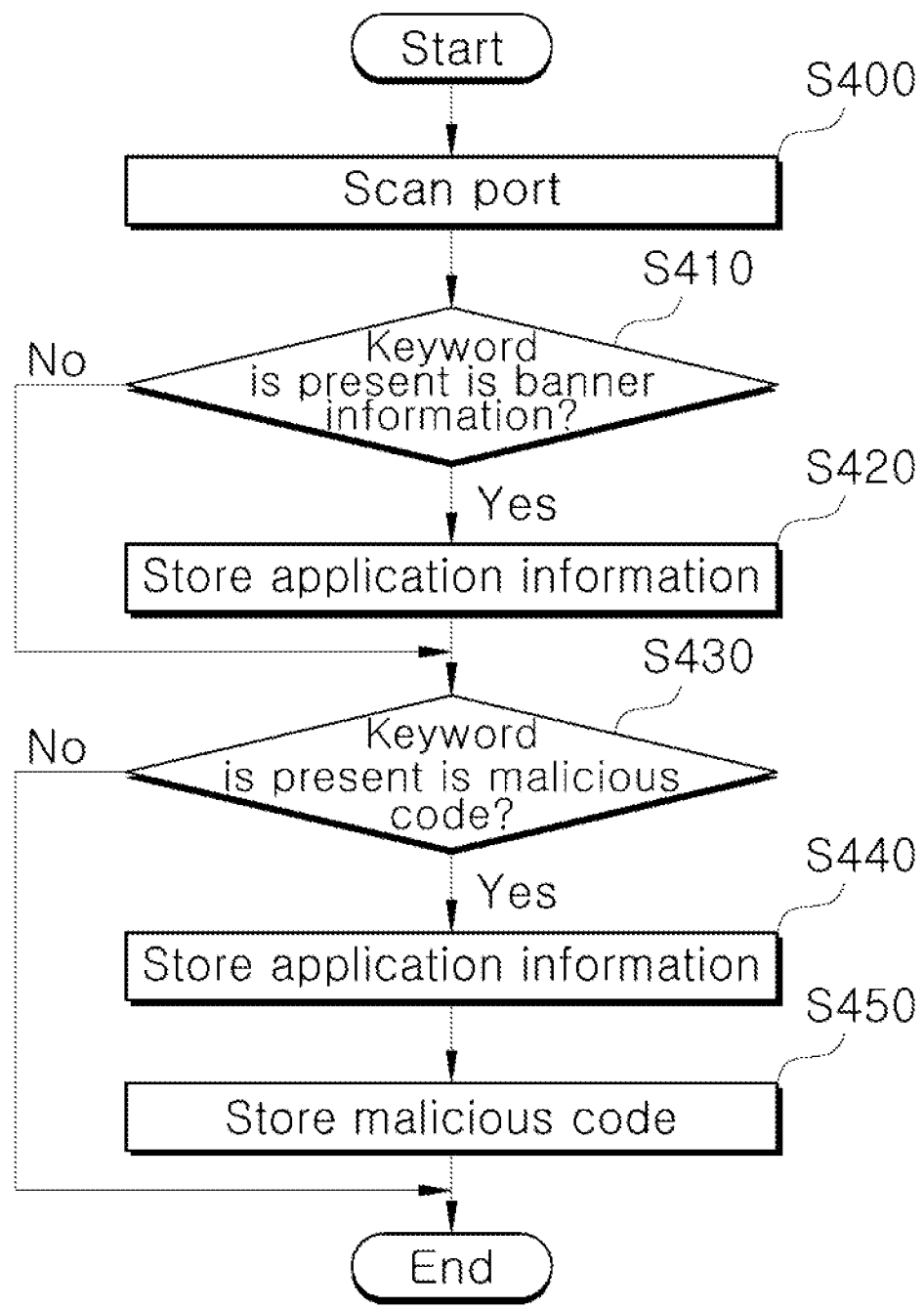
FIG. 6 is a flowchart of a method for extracting IP monitoring information according to another embodiment of the present disclosure.

FIG. 6 is a flowchart of a method for extracting IP monitoring information according to another embodiment of the present disclosure.

Referring to FIG. 6, the method for extracting IP monitoring information according to another embodiment of the present disclosure includes: scanning a port S400; determining a presence or absence of a keyword in banner information S410; and storing application information S420.

The security control server 100 scans all ports of the target IP address S400.

In addition, the security control server 100 identifies whether a keyword is present in the banner information S410. When the keyword is present, the application information is stored as IP monitoring information S420.

In addition, the security control server 100 identifies whether a keyword is present in the malicious code S430. When the keyword is present, the application information and the malicious code information are stored as IP monitoring information S440, S450.

Figure 7:
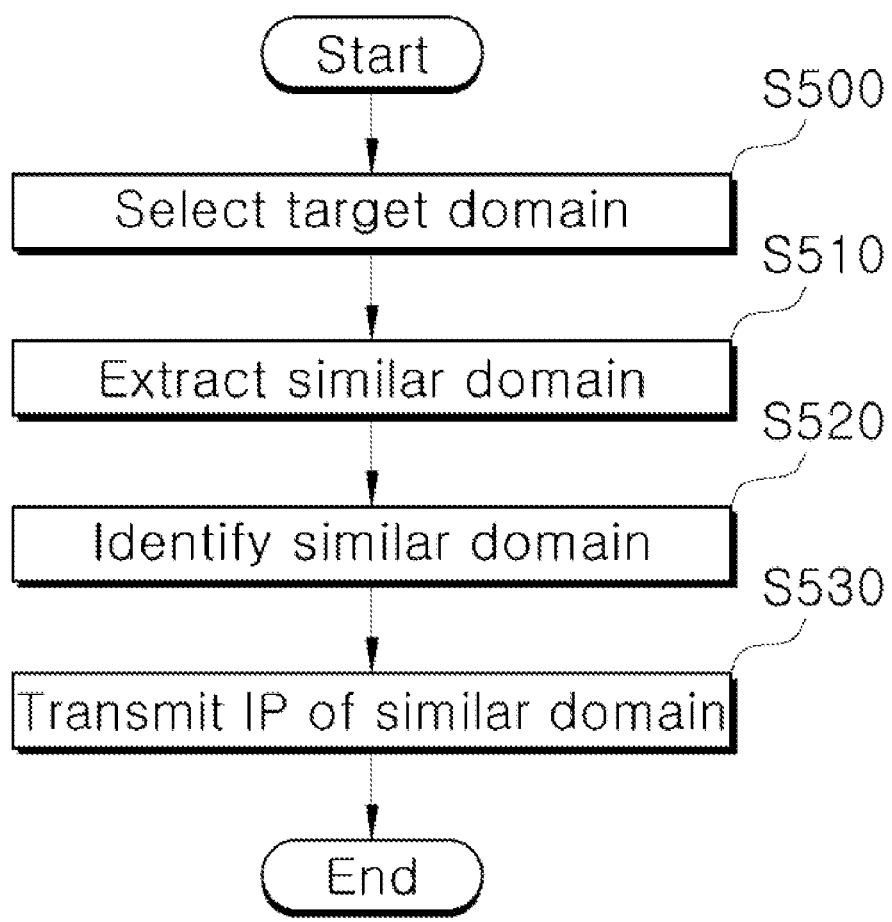
FIGS. 7 and 8 are flowcharts of a security control method using a domain according to an embodiment of the present disclosure.
Figure 8:
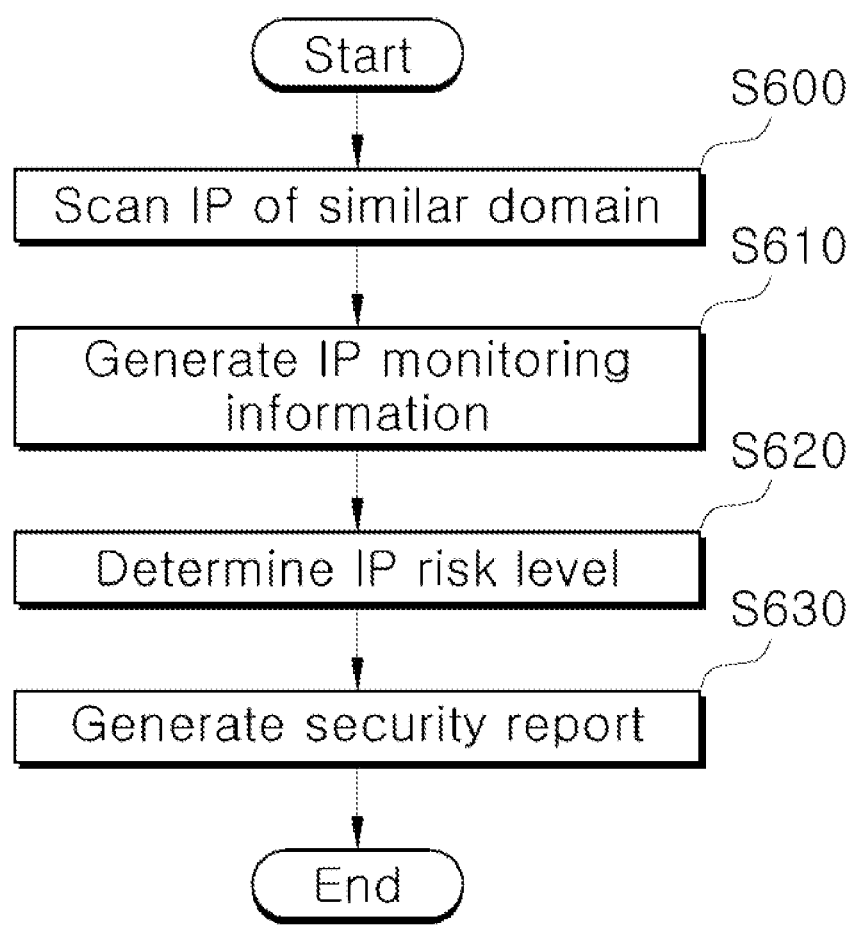

FIGS. 7 and 8 are flowcharts of a security control method using a domain according to an embodiment of the present disclosure, and are flowcharts of a method of generating IP scanning and IP monitoring information using a domain.

Referring to FIG. 7, the security control method using a domain according to an embodiment of the present disclosure includes: selecting a target domain S500; extracting a similar domain S510; identifying a similar domain S520; and transmitting an IP of a similar domain S530.

The security control server 100 selects the domain input by an administrator as a target domain S500.

In addition, the security control server 100 extracts a similar domain from the entire domain list through a similar domain search algorithm S510.

In addition, the security control server 100 uses the domain management server 330 to identify whether the extracted similar domain is actually a domain preempted by another user S520.

In addition, the security control server 100 transmits the IP address of the similar domain as the target IP address to the IP scanning unit 120 S530.

Referring to FIG. 8, the security control method using a domain according to an embodiment of the present disclosure includes: scanning an IP of a similar domain using a target keyword S600; generating IP monitoring information S610; determining an IP risk level S620; and generating a security report S630.

The security control server 100 selects an IP address of a similar domain as a target IP address, and scans the selected target IP address S600.

In addition, the generation of the IP monitoring information S610, the determination of the IP risk level S620, and the generation of the security report S630 are the same as described above.

Figure 9:
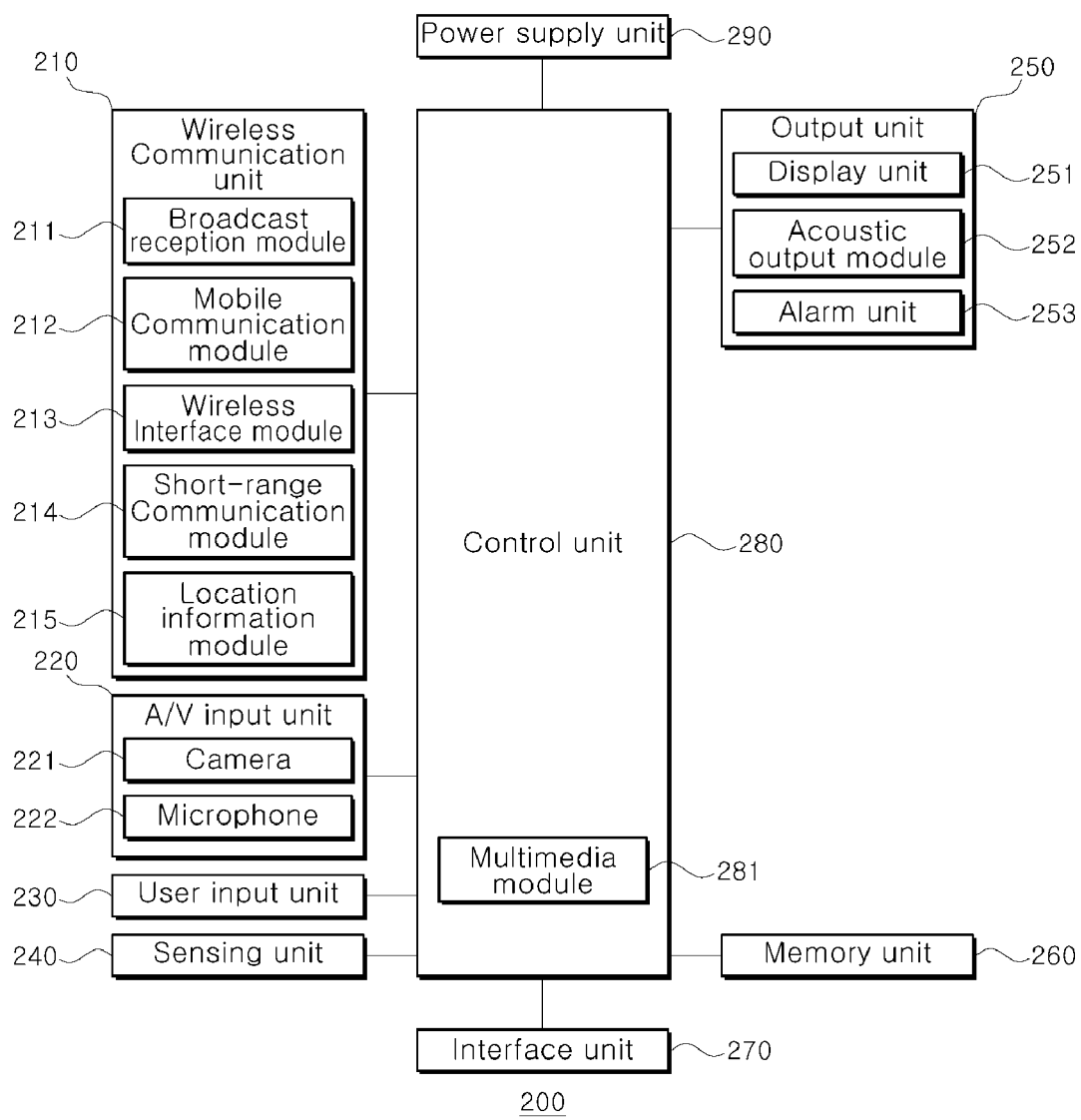
FIG. 9 is a diagram illustrating a configuration of an administrator terminal according to an embodiment of the present disclosure.

FIG. 9 is a diagram illustrating a configuration of the administrator terminal 200 according to an embodiment of the present disclosure. Hereinafter, the constituents constituting the administrator terminal 200 illustrated in FIG. 9 will be described one by one.

The wireless communication unit 210 may include one or more components for performing wireless communication between the administrator terminal 200 and the wireless communication system or wireless communication between the administrator terminal 200 and the network in which the administrator terminal 200 is located. For example, the wireless communication unit 210 may include a broadcast reception module 211, a mobile communication module 212, a wireless Internet module 213, a short-range communication module 214, and a location information module 215.

The broadcast reception module 211 receives a broadcast signal and/or broadcast associated information from an external broadcast management server via a broadcast channel. The broadcast channel may include a satellite channel and a terrestrial channel. The broadcast associated information may be provided through a mobile communication network, and in this case, may be received by the mobile communication module 212.

In addition, the mobile communication module 212 transmits and receives a wireless signal to and from at least one of a base station, an external terminal, and a server on a mobile communication network. The wireless signal may include various types of data associated with transmission and reception of a voice call signal, a video call signal, or a text/multimedia message.

The wireless Internet module 213 refers to a module for wireless Internet access, and may be internally or externally coupled to the administrator terminal 200.

The short-range communication module 214 refers to a module for short-range communication. As the short-range communication technology, Bluetooth®, Radio Frequency Identification (RFID), Infrared Data Association (IrDA), Ultra Wideband (UWB), and ZigBee® may be used.

In addition, the location information module 215 is a module for identifying or obtaining the location of the administrator terminal 200. An example is a Global Position System (GPS) module. The GPS module receives location information from a plurality of satellites. The location information may include coordinate information indicated by latitude and longitude.

An A/V (Audio/Video) input unit 220 is for inputting an audio signal or a video signal, and may include a camera 221 and a microphone 222. The camera 221 processes an image frame such as a still image or a moving image obtained by an image sensor in a video call mode or a photographing mode. Then, the processed image frame may be displayed on the display unit 251.

The image frame processed by the camera 221 may be stored in the memory 260 or transmitted to the outside through the wireless communication unit 210. Two or more cameras 221 may be provided according to the configuration of the administrator terminal 200.

The microphone 222 receives an external acoustic signal by a microphone in a call mode, a recording mode, and a voice recognition mode, and processes the same as electrical voice data. In addition, the processed voice data may be converted into a form that may be transmitted to a mobile communication base station through the mobile communication module 212 in the case of a call mode, and then output. The microphone 222 may implement various noise removal algorithms for removing noise generated in the process of receiving an external acoustic signal.

The user input unit 230 receives an input operation from a user and generates input data for controlling the operation of the administrator terminal 200.

The sensing unit 240 detects the current state of the administrator terminal 200, such as a location of the administrator terminal 200, a presence or absence of user contact, orientation of the administrator terminal 200, and acceleration/deceleration of the administrator terminal 200, and generates a sensing signal for controlling the operation of the administrator terminal 200.

The interface unit 270 serves as an interface with all external devices connected to the administrator terminal 200. For example, typical external devices include wired/wireless headset ports, external charger ports, wired/wireless data ports, memory card ports, ports for connecting devices equipped with identification modules, audio input/output (I/O) ports, video input/output (I/O) ports, and earphone ports.

The output unit 250 is for outputting an audio signal, a video signal, or an alarm signal, and may include a display unit 251, an acoustic output module 252, and an alarm unit 253.

The display unit 251 displays and outputs information processed by the administrator terminal 200. For example, when the terminal is in a call mode, a user interface (UI) or graphic user interface (GUI) related to a call is displayed. In addition, when the administrator terminal 200 is in a video call mode or a shooting mode, a captured and/or received image, UI, or GUI is displayed.

As described above, when the display unit 251 and the touch pad form an interlayer structure to form a touch screen, the display unit 251 may be used as an input device in addition to an output device. The display unit 251 may include at least one of a liquid crystal display, a thin film transistor-liquid crystal display, an organic light-emitting diode, a flexible display, and a three-dimensional display. In addition, two or more display units 251 may exist according to an implementation form of the administrator terminal 200. For example, an external display unit (not shown) and an internal display unit (not shown) may be simultaneously provided in the administrator terminal 200.

The acoustic output module 252 outputs audio data received from the wireless communication unit 210 or stored in the memory 260 in a call signal reception, a call mode or a recording mode, a voice recognition mode, and a broadcast reception mode. In addition, the acoustic output module 252 outputs an acoustic signal related to a function (for example, a call signal reception sound, and a message reception sound) performed in the administrator terminal 200. The acoustic output module 252 may include a speaker, and a buzzer.

The alarm unit 253 outputs a signal for notifying the occurrence of an event in the administrator terminal 200. Examples of events occurring in the terminal include call signal reception, message reception, and key signal input.

The memory 260 may store a program for processing and control of the control unit 280, and may provide a function for temporary storage of input/output data (for example, phonebook, message, still image, and video).

The memory 260 may include at least one type of storage medium of a flash memory, a hard disk, a multimedia card micro, a card type memory (for example, an SD memory or an XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disc.

The control unit 280 typically controls the overall operations of the terminal. For example, the control unit 280 performs control and processing associated with voice calls, data communications, and video calls. In addition, the control unit 280 may include a multimedia module 281 that provides multimedia playback. The multimedia module 281 may be implemented within the control unit 280 or may be implemented separately from the control unit 280.

In addition, the control unit 280 receives a target IP address, a target keyword, and a target domain from an administrator, transmits the input target IP address, the target keyword, and the target domain to the security control server 100, receives a security report from the security control sever 100, and outputs the received security report to the administrator.

The power supply unit 290 receives external power and internal power under the control of the control unit 280 to supply power required for operation of each component.

The operations of a method or algorithm described in connection with the embodiments of the present disclosure may be embodied directly in hardware, in a software module executed by hardware, or in a combination thereof. The software module may reside on a Random Access Memory (RAM), a Read Only Memory (ROM), an Erasable Programmable ROM (EPROM), an Electrically Erasable Programmable ROM (EEPROM), a Flash memory, a hard disk, a removable disk, a CD-ROM, or a computer readable recording medium in any form well known in the technical field to which the present disclosure pertains.

Although the embodiments of the present disclosure have been described with reference to the attached drawings, those skilled in the technical field to which the present disclosure pertains will understand that the present disclosure may be practiced in other detailed forms without departing from the technical spirit or essential features of the present disclosure. Therefore, it should be understood that the above-described embodiments are exemplary in all aspects rather than being restrictive.

The invention claimed is:

1. A security control method performed by a control unit included in a security control server, the method comprising:
    selecting a target Internet Protocol (IP) address that is an IP address of a security control target;
    generating IP monitoring information which includes the IP address of the target IP address, banner information, application information, a malicious code, and a similar domain, by performing:
        scanning all ports of the target IP address ranging from a 1.0.0.0/8 band to a 255.0.0.0/8 band;
        from a result of the scanning, collecting the banner information for the all ports of the target IP address;
        from the collected banner information, extracting the application information, which includes at least one of an application name, an application version, protocol information, and a scanned time;
        selecting a character string inputted by an administrator as a target keyword;
        when the target keyword is included in the banner information of any port of the target IP address, storing the banner information and the application information of the target IP address as the IP monitoring information; and when the target keyword is included in the malicious code collected from the target IP address, storing the collected malicious code as the IP monitoring information;

determining an IP risk level of the target IP address by using the IP monitoring information by performing:

determining the IP risk level by using a scoring algorithm, in which a security control server assigns a score to the IP monitoring information of the target IP address, and determines the IP risk level of the target IP address according to the sum of assigned scores; or determining the IP risk level through machine learning, in which the security control server inputs the IP monitoring information of the target IP address into a pre-learned machine learning model, and determines the IP risk level derived as a result thereof as the IP risk level of the target IP address; and generating a security report including at least one of an IP list determined by a preset IP risk level and the IP monitoring information of the target IP address included in the IP list.

2. The method of claim 1, further comprising:
selecting a target domain;
extracting a domain similar to the target domain;
identifying whether the similar domain is preempted;
and when the similar domain is preempted, storing the similar domain as the IP monitoring information of the target IP address corresponding to the target domain.

3. The method of claim 2, wherein in the selection of the target IP address, an IP address of the similar domain is selected as the target IP address.

4. The method of claim 1, further comprising:
storing the IP monitoring information in a database; and
classifying and storing the IP monitoring information according to a presence or absence of the banner information, a presence or absence of the malicious code information, and a presence or absence of the similar domain.

5. A non-transitory computer readable recording medium storing software that, when executed by a security control server, causes a hardware processor of the security control server to execute the security control method of claim 1.

6. A security control server, comprising:
a hardware memory configured to store data; and
a hardware processor configured to:
select a target Internet Protocol (IP) address that is an IP address of a security control target;
generate IP monitoring information which includes the IP address of the target IP address, banner information, application information, a malicious code, and a similar domain, by performing:

scanning all ports of the target IP address ranging from a 1.0.0.0/8 band to a 255.0.0.0/8 band;

from a result of the scanning, collecting the banner information for the all ports of the target IP address;

from the collected banner information, extracting the application information, which includes at least one of an application name, an application version, protocol information, and a scanned time;

selecting a character string inputted by an administrator as a target keyword;

when the target keyword is included in the banner information of any port of the target IP address, storing the banner information and the application information of the target IP address as the IP monitoring information; and when the target keyword is included in the malicious code collected from the target IP address, storing the collected malicious code as the IP monitoring information;

determine an IP risk level of the target IP address by using the IP monitoring information by performing:

determining the IP risk level by using a scoring algorithm, in which a security control server assigns a score to the IP monitoring information of the target IP address, and determines the IP risk level of the target IP address according to the sum of assigned scores; or determining the IP risk level through machine learning, in which the security control server inputs the IP monitoring information of the target IP address into a pre-learned machine learning model, and determines the IP risk level derived as a result thereof as the IP risk level of the target IP address; and generate a security report including an IP list determined as a preset IP risk level and the IP monitoring information of the target IP address included in the IP list.

7. The security control server of claim 6, wherein the hardware processor is further configured to:
select a target domain;
extract a domain similar to the target domain;
identify whether the similar domain is preempted;
and when the similar domain is preempted, store the similar domain as the IP monitoring information of the target IP address corresponding to the target domain, wherein an IP address of the similar domain is selected as the target IP address.

8. The security control server of claim 6, wherein the hardware memory is further configured to:
store the IP monitoring information in a database; and
classify and store the IP monitoring information according to a presence or absence of the banner information, a presence or absence of the malicious code information, and a presence or absence of the similar domain.

* * * * *